(12) United States Patent
Gagnon et al.

(10) Patent No.: US 8,500,189 B2
(45) Date of Patent: Aug. 6, 2013

(54) OFF-ROAD VEHICLE HAVING A CARGO BOX

(71) Applicant: Bombardier Recreational Products, Inc., Valcourt (CA)

(72) Inventors: Claude Gagnon, Magog (CA); Daniel Nadeau, St-Denis-de-Brompton (CA); David Belzile, Granby (CA); Stephane Sanschagrin, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/681,531

(22) Filed: Nov. 20, 2012

(65) Prior Publication Data

US 2013/0088041 A1    Apr. 11, 2013

Related U.S. Application Data

(60) Continuation of application No. 13/431,495, filed on Mar. 27, 2012, now Pat. No. 8,328,271, which is a division of application No. 12/863,062, filed as application No. PCT/US2008/052636 on Jan. 31, 2008, now Pat. No. 8,172,310.

(51) Int. Cl.
*B62D 33/02* (2006.01)

(52) U.S. Cl.
USPC ................................................... 296/183.1

(58) Field of Classification Search
USPC ............ 296/183.1, 37.6, 182.1, 146.8, 184.1, 296/186.1, 26.11, 50, 51, 56, 57.1, 39.2; 220/1.5; 224/403, 404; 244/118.1
See application file for complete search history.

(56) References Cited

U.S. PATENT DOCUMENTS

| 4,394,100 A | | 7/1983 | Sperlich | |
|---|---|---|---|---|
| 4,573,731 A | * | 3/1986 | Knaack et al. | ............... 296/37.6 |
| 4,915,437 A | * | 4/1990 | Cherry | ......................... 296/37.6 |
| 5,076,387 A | | 12/1991 | Oka | |

(Continued)

FOREIGN PATENT DOCUMENTS

| GB | 2436817 A1 | 10/2007 |
|---|---|---|
| JP | 1215687 A | 8/1989 |
| RU | 2181847 C1 | 4/2002 |
| SU | 1533911 A1 | 1/1990 |

OTHER PUBLICATIONS

English abstract of JP 1215687, Published Aug. 29, 1989.

(Continued)

*Primary Examiner* — Kiran B Patel
(74) *Attorney, Agent, or Firm* — BCF LLP

(57) ABSTRACT

An off-road vehicle has a frame, at least four wheels, a seat, a steering assembly, an engine, and a cargo box pivotally mounted to the frame rearwardly of the seat. The cargo box includes: a cargo box body having a front wall, a pair of side walls, a lower floor, and an opened rear side; an upper floor supported inside the cargo box body above the lower floor; an upper tailgate for selectively closing an upper opened portion of the opened rear side; a lower cargo space defined at least in part between the front wall, the pair of side walls, the lower floor, and the upper floor; and an upper cargo space defined between the front wall, the pair of side walls, the upper floor, and the upper tailgate when the upper tailgate closes the upper opened portion of the opened rear side.

11 Claims, 13 Drawing Sheets

U.S. PATENT DOCUMENTS

| | | | | |
|---|---|---|---|---|
| 5,352,008 | A * | 10/1994 | Denvir | 296/50 |
| 5,468,037 | A * | 11/1995 | Peterson et al. | 296/57.1 |
| 5,685,593 | A | 11/1997 | O'Connor | |
| 5,845,952 | A * | 12/1998 | Albertini et al. | 296/37.6 |
| 5,951,233 | A * | 9/1999 | Boucher et al. | 414/495 |
| 6,659,566 | B2 | 12/2003 | Bombardier | |
| 6,764,130 | B1 * | 7/2004 | Hull | 296/186.4 |
| 6,827,386 | B2 * | 12/2004 | Stevenson | 296/51 |
| 6,874,839 | B2 * | 4/2005 | Acker et al. | 296/57.1 |
| 6,923,507 | B1 * | 8/2005 | Billberg et al. | 298/17 R |
| 6,941,654 | B1 * | 9/2005 | Sears | 29/897.2 |
| 6,966,597 | B2 * | 11/2005 | Tegtmeier | 296/62 |
| 7,367,417 | B2 | 5/2008 | Inui et al. | |
| 7,731,260 | B2 * | 6/2010 | Heller | 296/50 |
| 7,976,105 | B2 * | 7/2011 | Kennedy | 298/23 MD |
| 8,002,331 | B2 * | 8/2011 | Bowers | 296/183.2 |
| 2003/0161709 | A1 * | 8/2003 | Musso et al. | 414/528 |
| 2007/0237614 | A1 | 10/2007 | Johnson | |
| 2011/0072596 | A1 * | 3/2011 | Kenny | 14/69.5 |
| 2011/0209937 | A1 * | 9/2011 | Belzile et al. | 180/291 |

OTHER PUBLICATIONS

International Search Report of PCT/U2008/052636; Nov. 25, 2008, Jan Nordlund.
English Abstract of RU 2181847, Published Apr. 27, 2002.
English Abstract of SU 1533911, Published Jan. 7, 1990.

* cited by examiner

OFF-ROAD VEHICLE HAVING A CARGO BOX

CROSS-REFERENCE

The present application is a continuation of U.S. patent application Ser. No. 13/431,495, filed Mar. 27, 2012, which is a divisional of U.S. patent application Ser. No. 12/863,062, filed Jul. 15, 2010, which is a United States National Stage Application of International Patent Application No. PCT/US2008/052636, filed Jan. 31, 2008, the entirety of all of which is incorporated herein by reference.

FIELD OF THE INVENTION

The present invention relates to off-road vehicles, and more specifically to off-road vehicles having a cargo box.

BACKGROUND OF THE INVENTION

Some off-road vehicles, such as recreational utility vehicles (RUVs) and all-terrain vehicles (ATVs), are provided with a cargo box at the rear thereof. U.S. Pat. No. 6,659,566, issued Dec. 9, 2003, illustrates and describes one such off-road vehicle. The addition of a cargo box to an off-road vehicle advantageously adds cargo space. However, once the cargo box is filled with soil or wood, for example, it becomes inconvenient to place the tools used to get the soil or wood (i.e. a shovel, an axe, or a chainsaw as the case may be) in the cargo box. This is because there may be no more room in the cargo box and/or portions of the tools which should preferably remain clean (i.e. handles, motor . . . ) would get dirty. In such cases, once the cargo box is filled, the tools usually need to be attached to a cargo rack on the off-road vehicle, which is less convenient than using the cargo box.

Therefore, there is a need for an off-road vehicle having a cargo box which addresses at least some of these inconveniences.

SUMMARY OF THE INVENTION

It is an object of the present invention to ameliorate at least some of the inconveniences present in the prior art.

In one aspect, an off-road vehicle has a frame and at least four wheels suspended from the frame. Each of the at least four wheels includes a tire. A seat is mounted on the frame. A steering assembly is disposed forwardly of the seat and is operatively connected to at least two of the at least four wheels. An engine is mounted to the frame and is operatively connected to at least two of the at least four wheels. A cargo box is pivotally mounted to the frame rearwardly of the seat. The cargo box includes: a cargo box body having a front wall, a pair of side walls extending from the front wall, a lower floor connected to a lower end of the front wall and the pair of side walls, and an opened rear side; an upper floor supported inside the cargo box body above the lower floor; an upper tailgate for selectively closing an upper opened portion of the opened rear side; a lower cargo space defined at least in part between the front wall, the pair of side walls, the lower floor, and the upper floor; and an upper cargo space defined between the front wall, the pair of side walls, the upper floor, and the upper tailgate when the upper tailgate closes the upper opened portion of the opened rear side.

In a further aspect, the upper floor is removable from the cargo box body, such that when the upper floor is removed the lower cargo space communicates with the upper cargo space.

In an additional aspect, each side wall defines a step extending towards the other side wall.

In a further aspect, the upper floor is supported above the lower floor by the steps.

In an additional aspect, the upper floor is supported adjacent the front wall and the pair of side walls.

In a further aspect, the upper floor is pivotable relative to the cargo box body.

In an additional aspect, the upper tailgate is connected to the steps.

In a further aspect, the upper tailgate is pivotally connected to the steps.

In an additional aspect, the seat includes a seat base and a backrest, and the steering assembly includes a steering wheel.

In a further aspect, the seat is a driver seat. A passenger seat is connected to the frame at a position laterally beside the driver seat. The passenger seat has a seat base and a backrest.

In an additional aspect, the seat is a straddle seat, and the steering assembly includes a handlebar.

For purposes of this application the term "off-road vehicle" refers to a vehicle which is typically used off paved surfaces such as a recreational utility vehicle (RUV) or an all-terrain vehicle (ATV). It should be understood that off-road vehicles could be used on paved surfaces, however they are specifically designed for off paved surfaces riding. An ATV refers to a wheeled vehicle designed for off-road use that travels on low pressure tires and has straddle seat. An RUV refers to an "opened" wheeled vehicle (contrary to a pickup truck which is a "closed" vehicle due to its closed passenger cabin) designed for off-road use which usually has side-by-side seating. Also, terms related to spatial orientation such as forwardly, rearwardly, left, and right, are as they would normally be understood by a driver of the vehicle sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to an all-terrain vehicle (ATV) and a recreational utility vehicle (RUV). However it should be understood that the present invention could be used on other types of off-road vehicles, such as turf vehicles for example.

Figure 1:
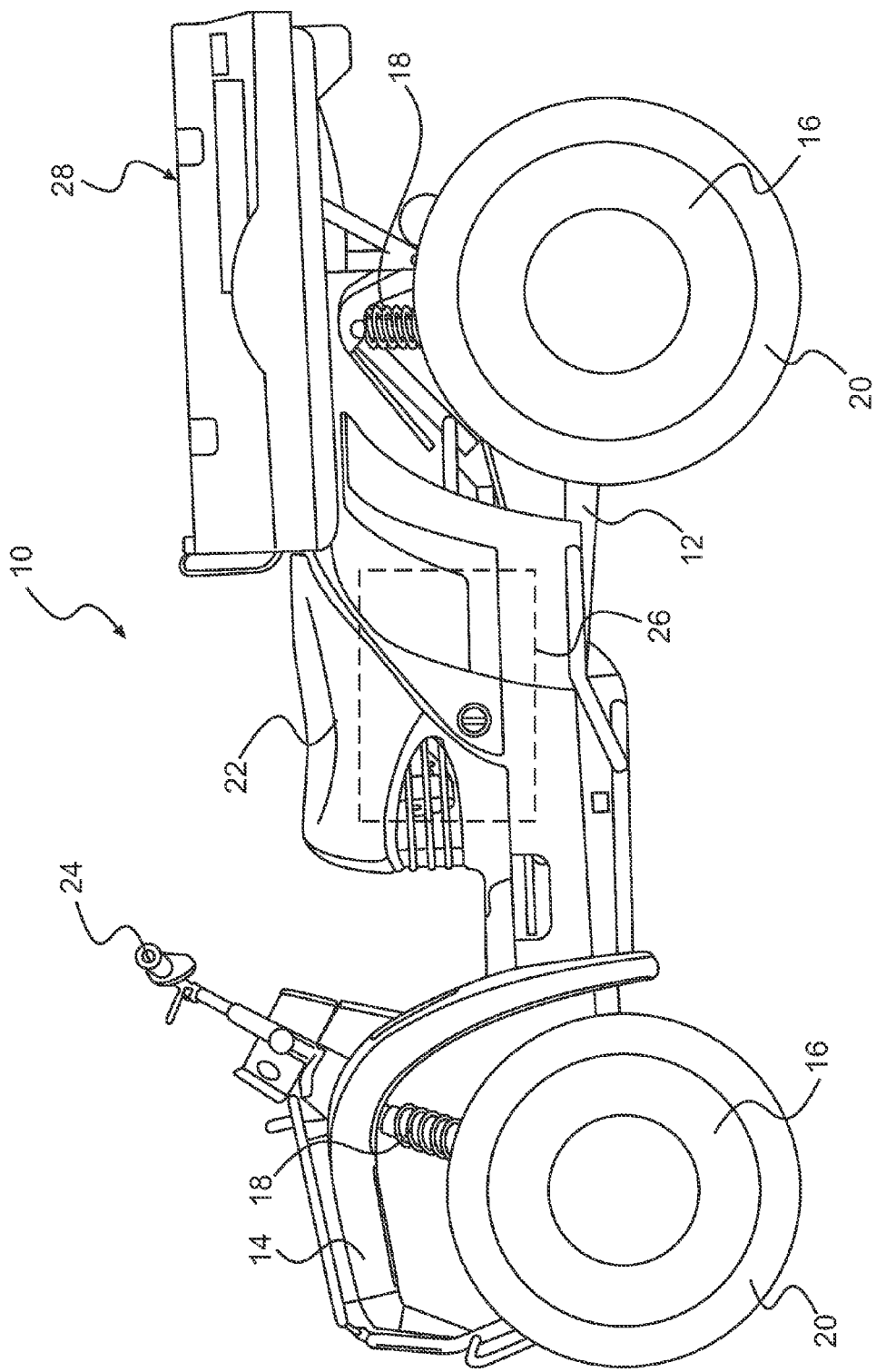
FIG. 1 is a left side elevation view of an all-terrain vehicle (ATV) in accordance with aspects of the present invention.

FIG. 1 illustrates an ATV 10. The ATV 10 has a frame 12 to which a vehicle body 14 is mounted. Four wheels 16 are suspended from the frame 12 via suspension elements 18. Each of the four wheels 16 has a tire 20. It is contemplated that the ATV 10 could have six or more wheels 16. A straddle seat 22 is mounted on the frame 12 to accommodate at least a driver of the ATV 10. A steering assembly including a handlebar 24 is disposed forwardly of the straddle seat 22. The steering assembly is operatively connected to the two front wheels 16 to permit steering of the ATV 10. An engine 26, shown schematically in FIG. 1, is mounted to the frame 12 below the straddle seat 22. The engine 26 is operatively connected to the four wheels 16 to power the ATV 10. It is contemplated that the engine 26 could be operatively connected to only two of the wheels 16. A cargo box 28 is pivotally mounted to the frame 12 rearwardly of the straddle seat 22. The ATV 10 has other features and components common to most ATVs such as footrests and cargo racks. As it is believed that these features and components would be readily recognized by one of ordinary skill in the art, further explanation and description of these components will not be provided herein. The cargo box 28 will not be described in detail since its features are the same as or are similar to the features of the cargo box 50 of the RUV 30 described in greater detail below. It should therefore be understood the description of the cargo box 50 provided below also applies to the cargo box 28.

Figure 2:
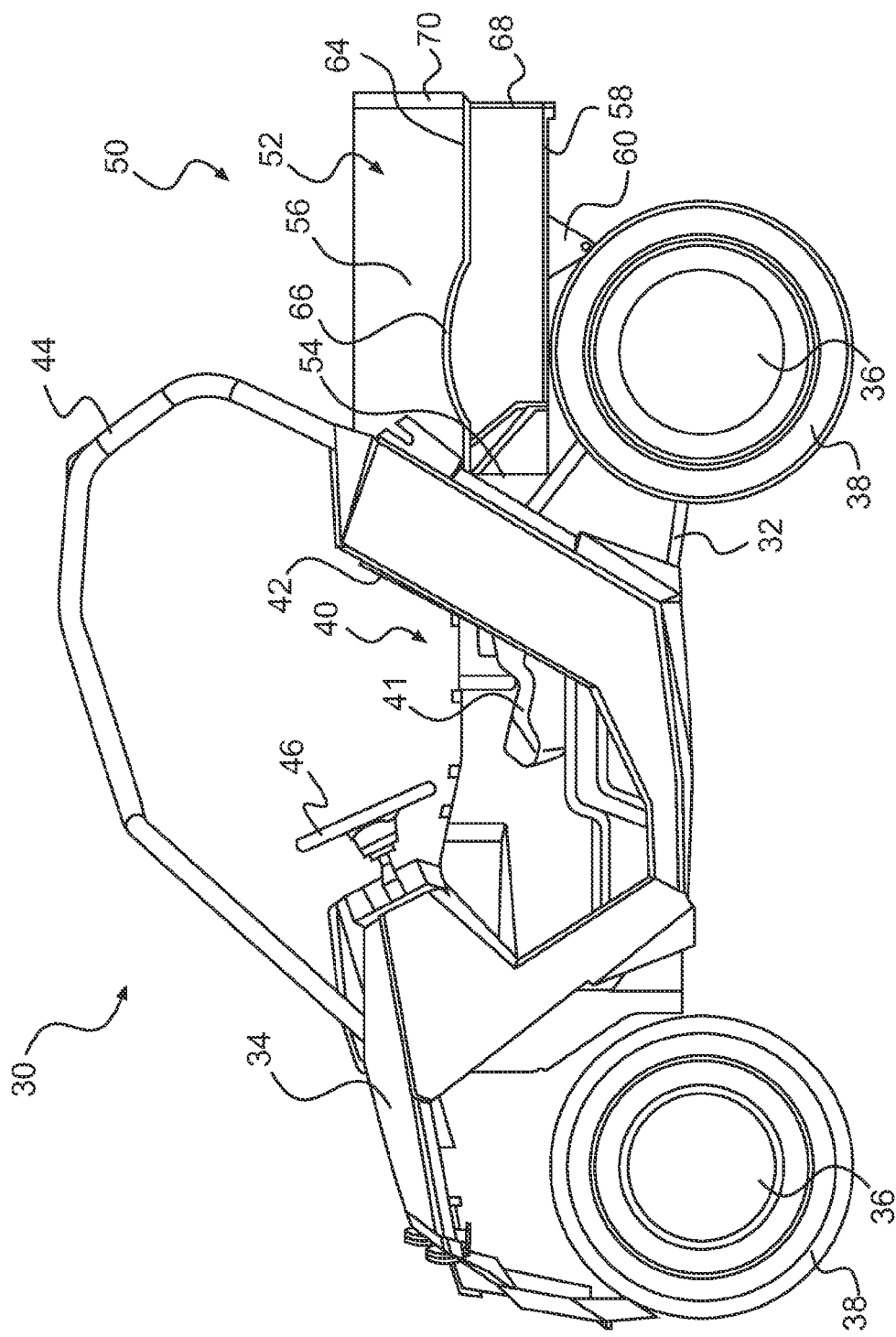
FIG. 2 is a left side elevation view of a recreational utility vehicle (RUV) in accordance with aspects of the present invention.
Figure 3:
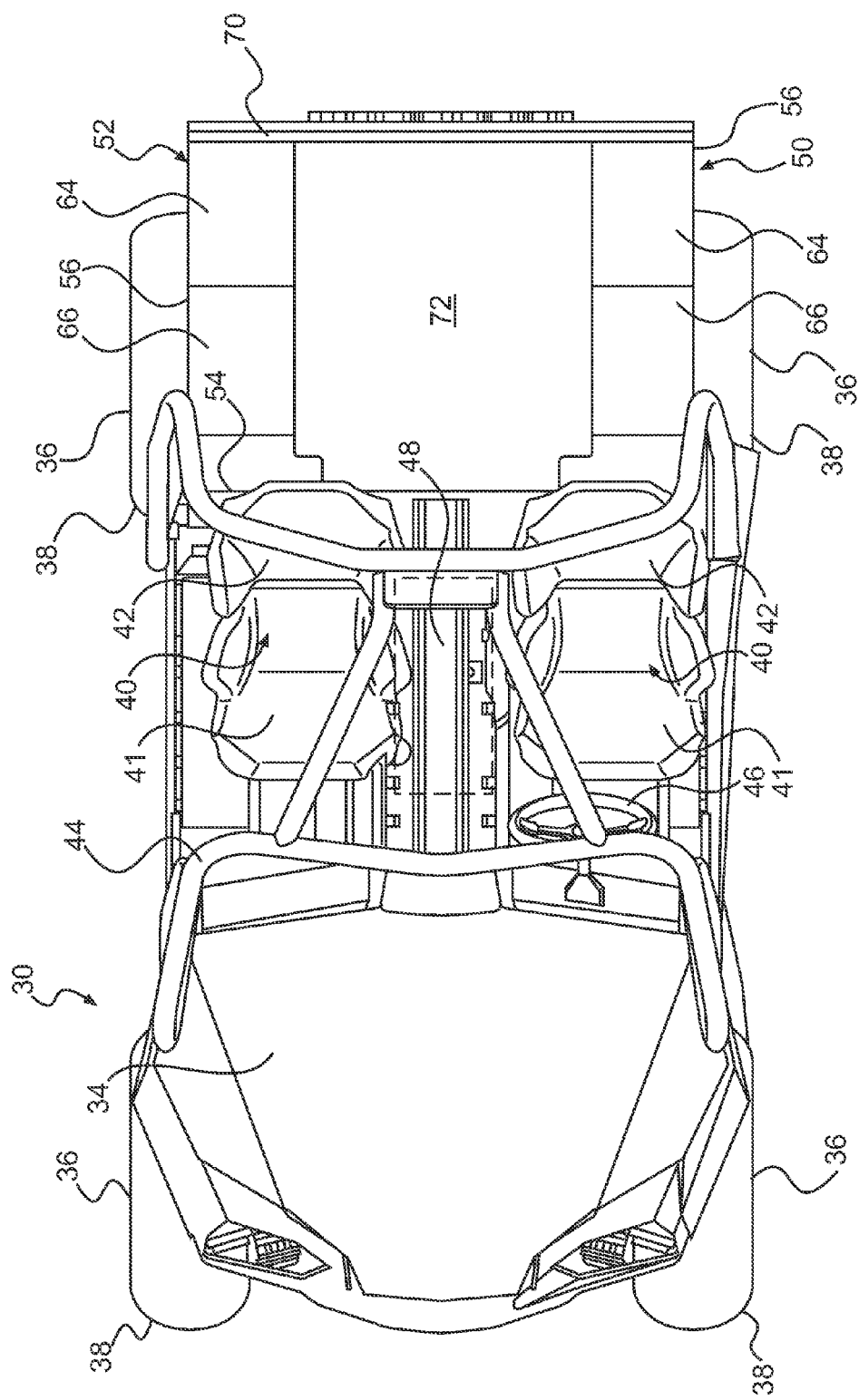
FIG. 3 is a top view of the RUV of FIG. 2.
Figure 4:
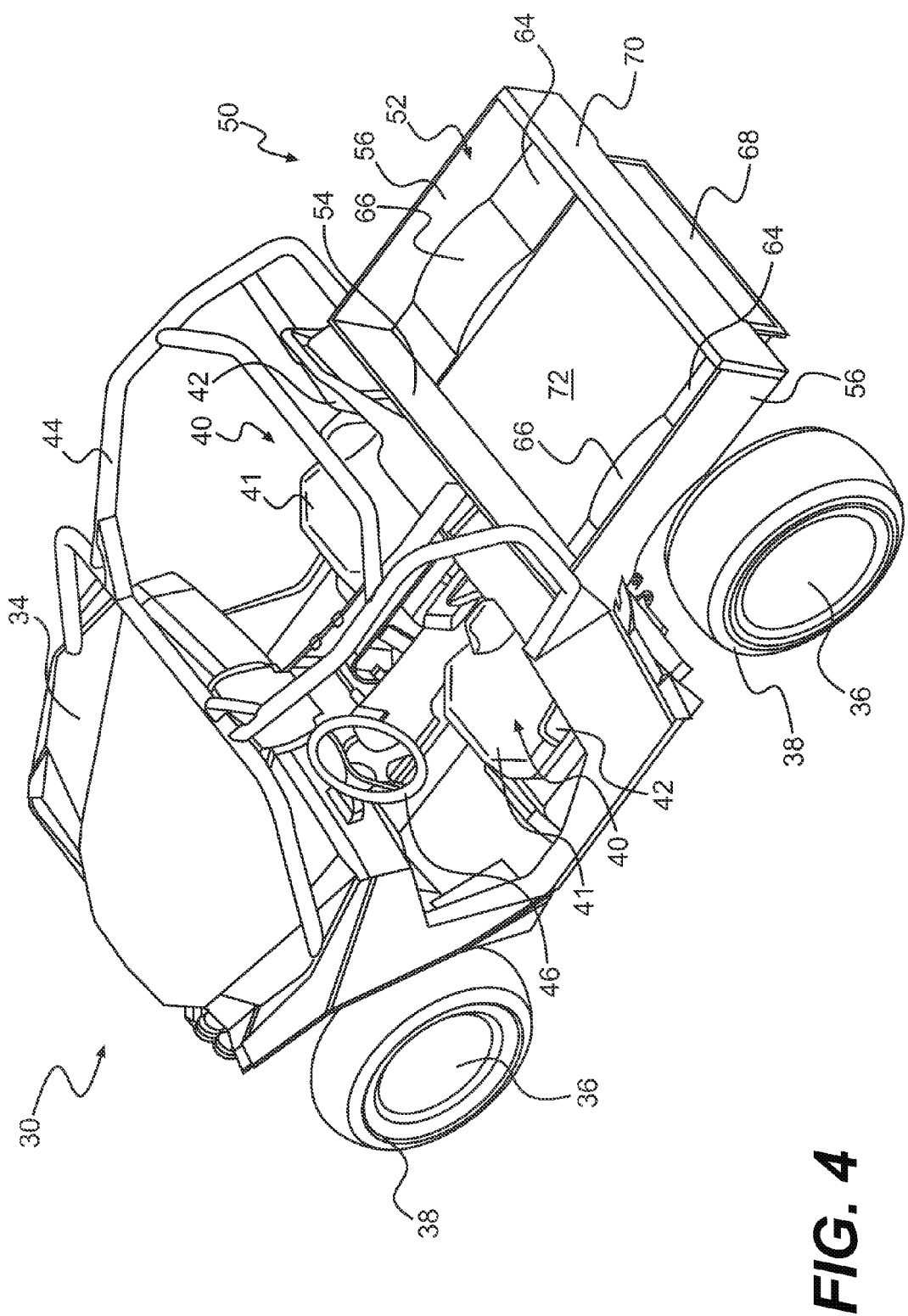
FIG. 4 is a perspective view, taken from a rear, left side of the RUV of FIG. 2.

FIGS. 2-10 illustrate an RUV 30. The RUV 30 has a frame 32 to which a vehicle body 34 is mounted. Four wheels 36 are suspended from the frame 32 via suspension elements (not shown). Each of the four wheels 36 has a tire 38. It is contemplated that the RUV 30 could have six or more wheels 36. As best seen in FIG. 3, a pair of seats 40, each having a seat base 41 and a backrest 42, are mounted laterally beside each other on the frame 32 to accommodate a driver and a passenger of the RUV 30. A cage 44 is connected to the frame 32 and is disposed around the area where the seats 40 are located. A steering assembly including a steering wheel 46 is disposed forwardly of the driver seat 40. The steering assembly is operatively connected to the two front wheels 36 to permit steering of the RUV 30. An engine 48, shown schematically in FIG. 3, is mounted to the frame 32 between the seats 40. The engine 48 is operatively connected to the four wheels 36 to power the RUV 30. It is contemplated that the engine 48 could be operatively connected to only two of the wheels 36. A cargo box 50 is pivotally mounted to the frame 32 rearwardly of the seats 40. The RUV 30 has other features and components such as headlights and handles. As it is believed that these features and components would be readily recognized by one of ordinary skill in the art, further explanation and description of these components will not be provided herein.

Figure 8:
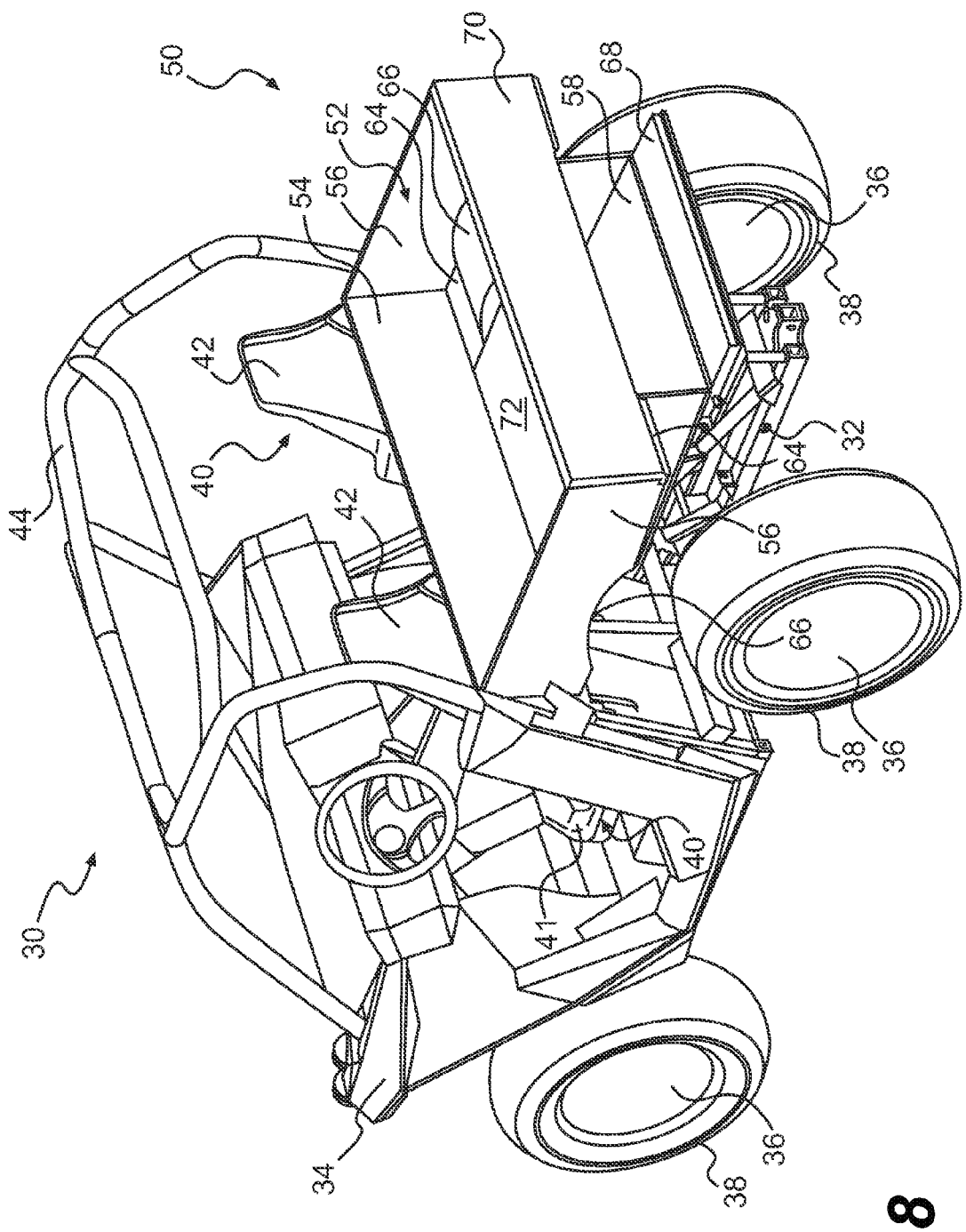
FIG. 8 is a perspective view, taken from a rear, left side of the RUV of FIG. 2 with a lower tailgate in an opened position.
Figure 9:
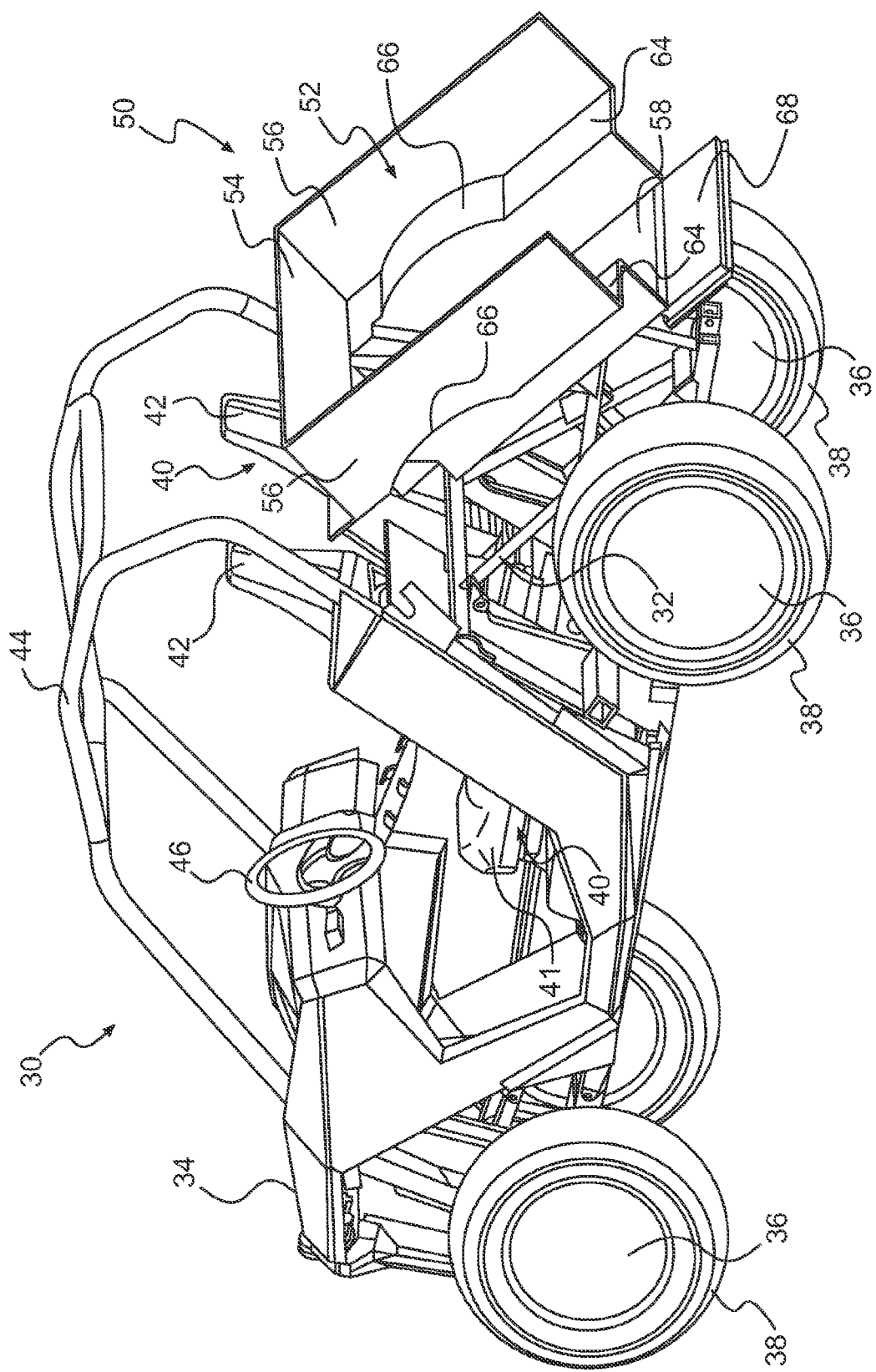
FIG. 9 is a perspective view, taken from a rear, left side of the RUV of FIG. 2 with the cargo box in a pivoted position, the upper floor removed, the upper tailgate removed, and the lower tailgate in an opened position.
Figure 10:
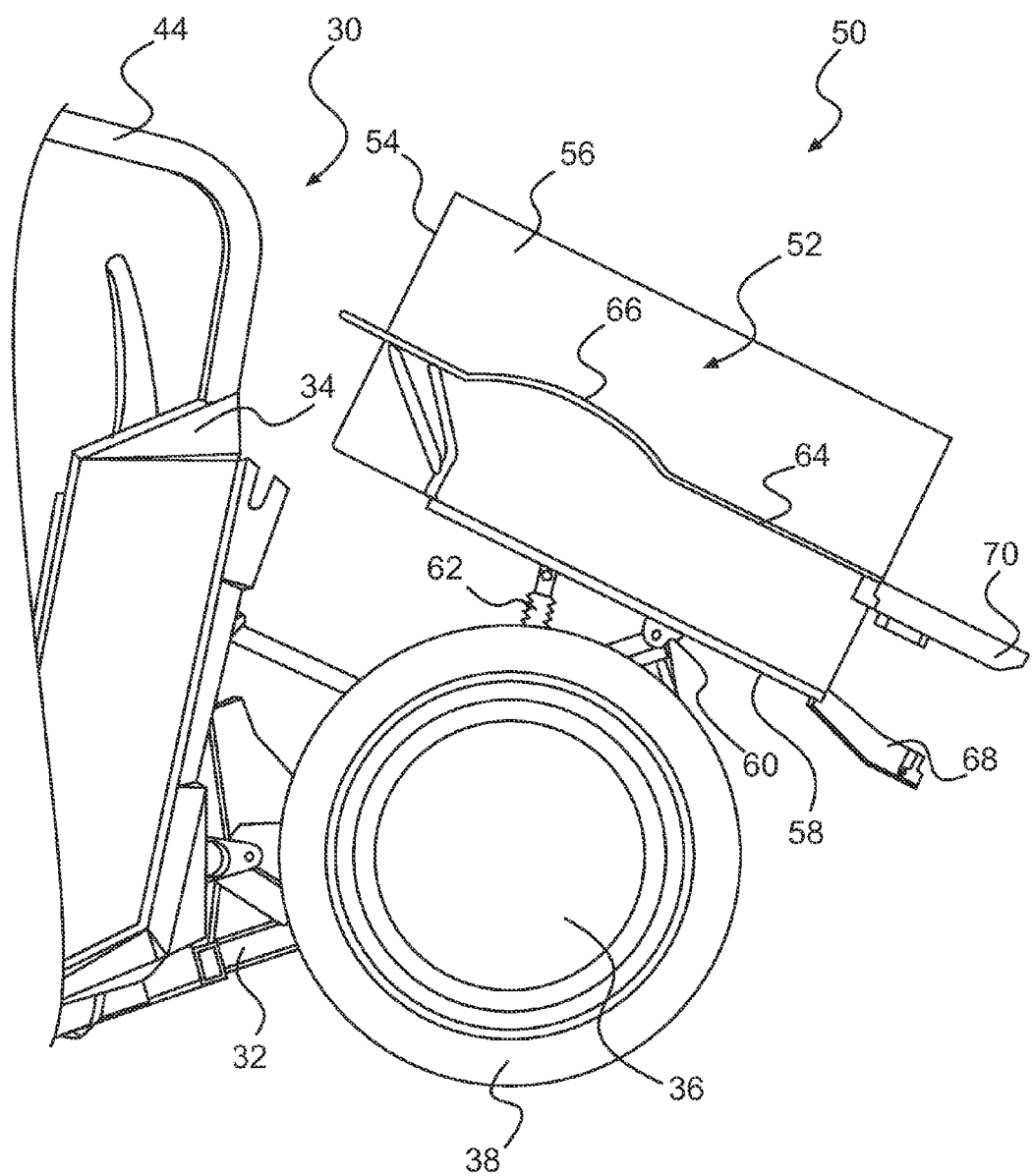
FIG. 10 is a left side elevation close-up view of the rear portion of the RUV of FIG. 2 with the cargo box in a pivoted position, and the upper and lower tailgates in their opened positions.

The cargo box 50 will now be described in greater detail. The cargo box 50 has a cargo box body 52. As best seen in FIG. 9, the cargo box 52 body has a front wall 54, a pair of side walls 56 extending rearwardly from the front wall 54, a lower floor 58 connected to a lower end of the front and the pair of side walls 54, 56, and an opened rear side. As seen in FIGS. 2 and 10, a bracket 60 is connected to the lower floor 58. The bracket 60 pivotally connects the cargo box 50 to the frame 32 such that the cargo box 50 can pivot from a generally horizontal position (shown in FIGS. 2-5, 7, and 8) to a pivoted position (shown in FIGS. 6, 9, and 10). By pivoting the cargo box 50, the contents of the cargo box 50 can easily be dumped on the ground. A latch assembly (not shown) is used to lock the cargo box 50 in the horizontal position. A user of the RUV 30 can release the latch assembly to allow the cargo box 50 to pivot. It should be understood that many different types of latch could be used. One such latch assembly is shown and described in U.S. Pat. No. 6,659,566, issued Dec. 9, 2003, the entirety of which is incorporated herein by reference. An air shock 62 (FIG. 10) connects the cargo box body 52 to the frame 32 to prevent the cargo box 50 from pivoting too quickly between the horizontal and the pivoted position.

Each side wall 56 of the cargo box body 52 defines a step 64 which extends generally horizontally towards the other side wall 56. This reduces the width of the lower portion of the cargo box body 52 such that it fits between the two rear wheels 36, thus allowing for a deeper cargo box body 52. Each step 64 has a curved portion 66 such that when the rear wheels 36 travel up relative to the cargo box body 32 (due to the suspension), the rear wheels 36 do not come into contact with the steps 64. The front wall 54, side walls 56 (including steps 64), and lower floor 58 are preferably integrally formed and are preferably made of structural foam. Alternatively, they could be made of plastic by using a rotomolding process. It is contemplated that other manufacturing processes could be used such as injection molding. It is also contemplated that other materials could be used, such as sheet metal that could be bent and welded together to form the cargo box body 52. It is also contemplated that each portion of the cargo box body 52 could be made separately and then fastened to the other portions thereof.

Figure 7:
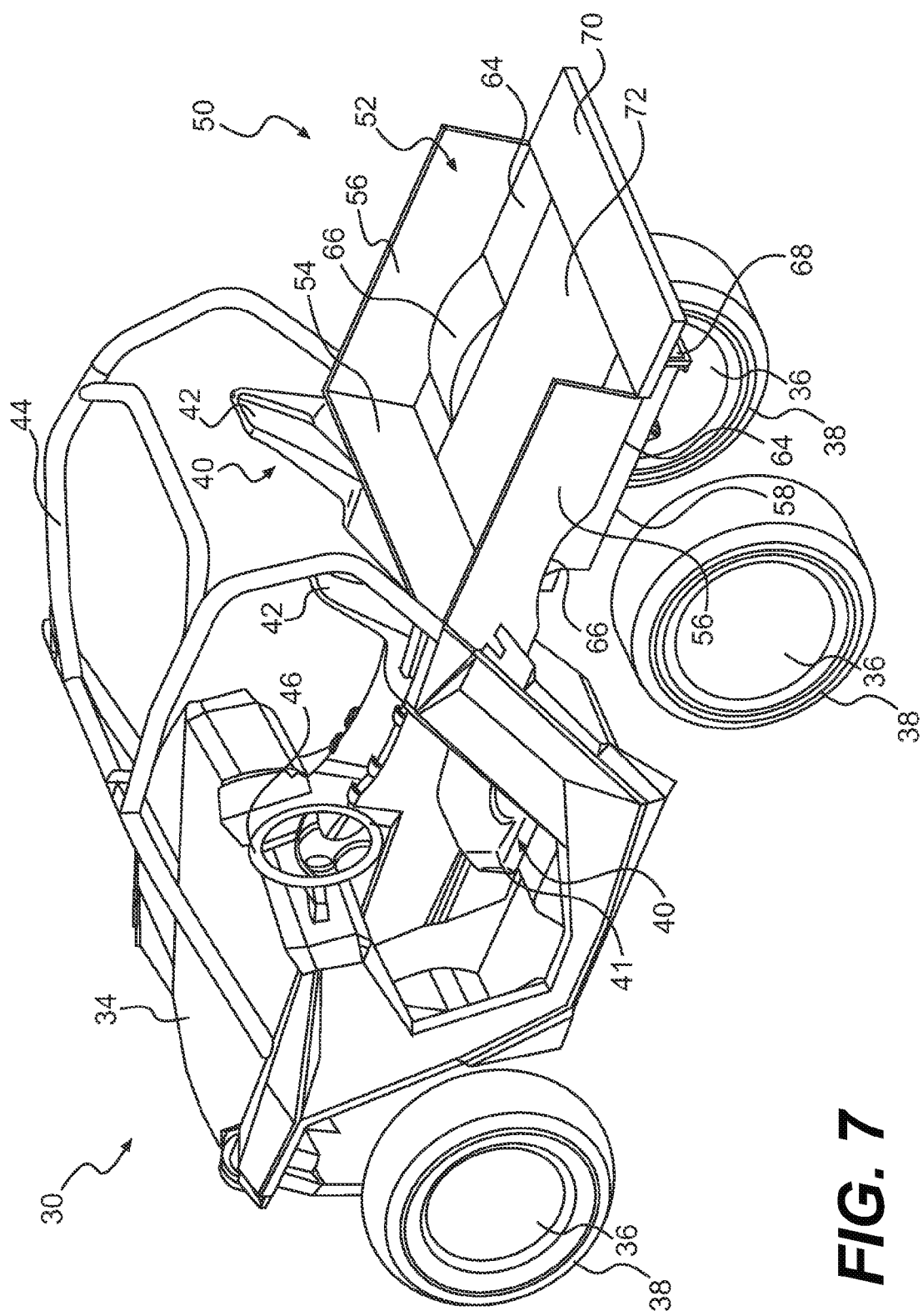
FIG. 7 is a perspective view, taken from a rear, left side of the RUV of FIG. 2 with an upper tailgate in an opened position.

A lower tailgate 68 is pivotally connected about a generally horizontal axis to the lower floor 58 of the cargo box body 52 at the rear thereof. The lower tailgate 68 selectively closes a portion of the opened rear side of the cargo box body 52 as described in greater detail below. The lower tailgate 68 is pivotable between a closed position, as seen in FIGS. 2-7, and an opened position, as seen in FIGS. 8-10. It is contemplated that the lower tailgate 68 could be removable from the cargo box body 52. A locking mechanism (not shown), such as latch, is used to lock the lower tailgate 68 in the closed position. The lower tailgate 68 is preferably made of structural foam. Alternatively, it could be made of plastic using a rotomolding process. It should be understood that, as with the cargo box 52, other materials and manufacturing processes could be used.

An upper tailgate 70 is pivotally connected about a generally horizontal axis to the steps 64 of the side wall 56 of the cargo box body 52 at the rear thereof. The upper tailgate 70 selectively closes a portion of the opened rear side of the cargo box body 52 as described in greater detail below. The upper tailgate 70 is pivotable between a closed position, as seen in FIGS. 2-6, and 8, and an opened position, as seen in FIGS. 7 and 10. As seen in FIG. 9, the upper tailgate 70 can also be removed from the cargo box body 52. A locking mechanism (not shown), such as a latch, is used to lock the upper tailgate 70 in the closed position. The upper tailgate 70 is preferably made of structural foam. Alternatively, it could be made of plastic using a rotomolding process. It should be understood that, as with the cargo box 52, other materials and manufacturing processes could be used.

Figure 11:
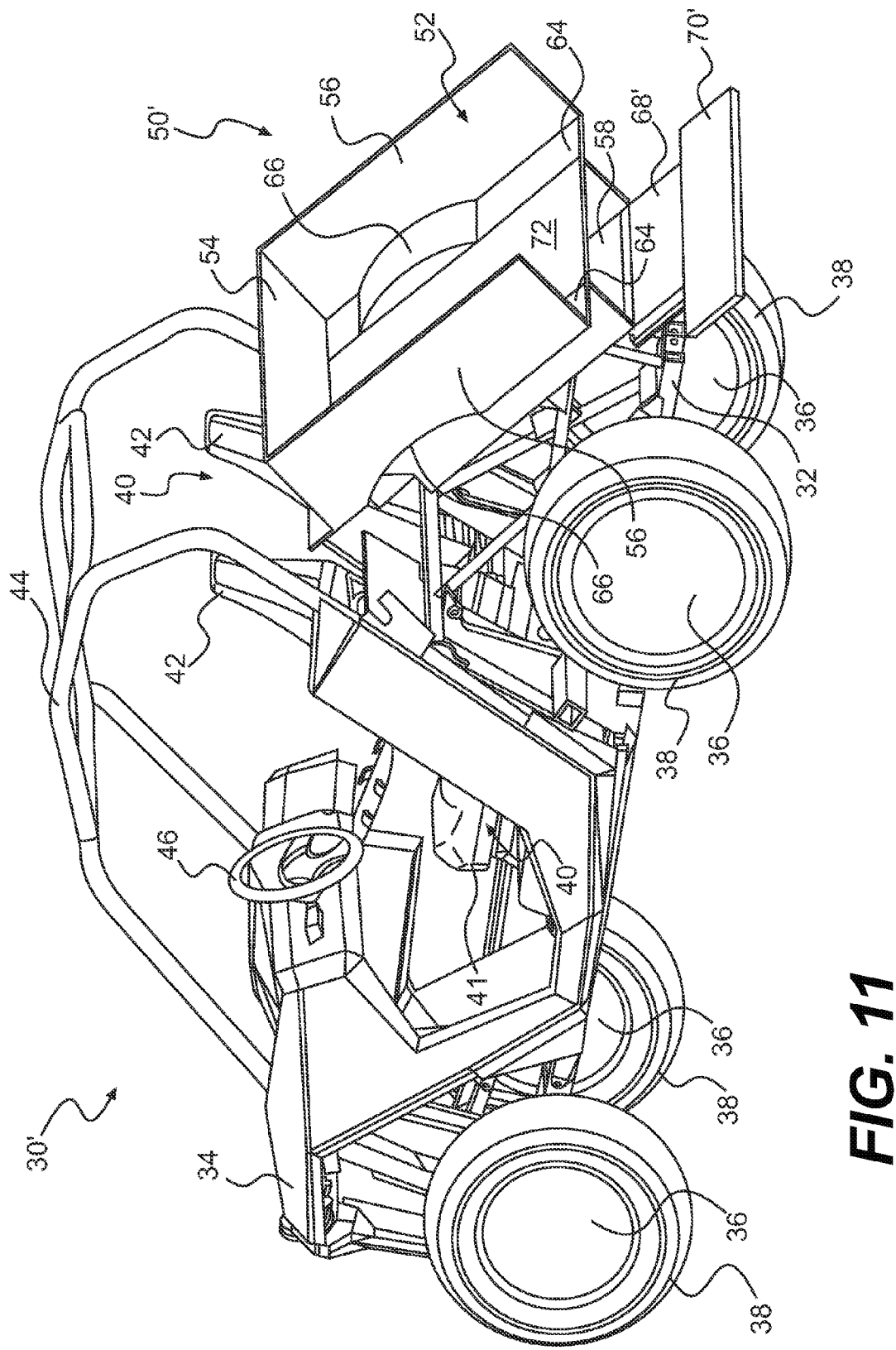
FIG. 11 is a perspective view, taken from a rear, left side of an alternative embodiment of the RUV of FIG. 2.
Figure 12:
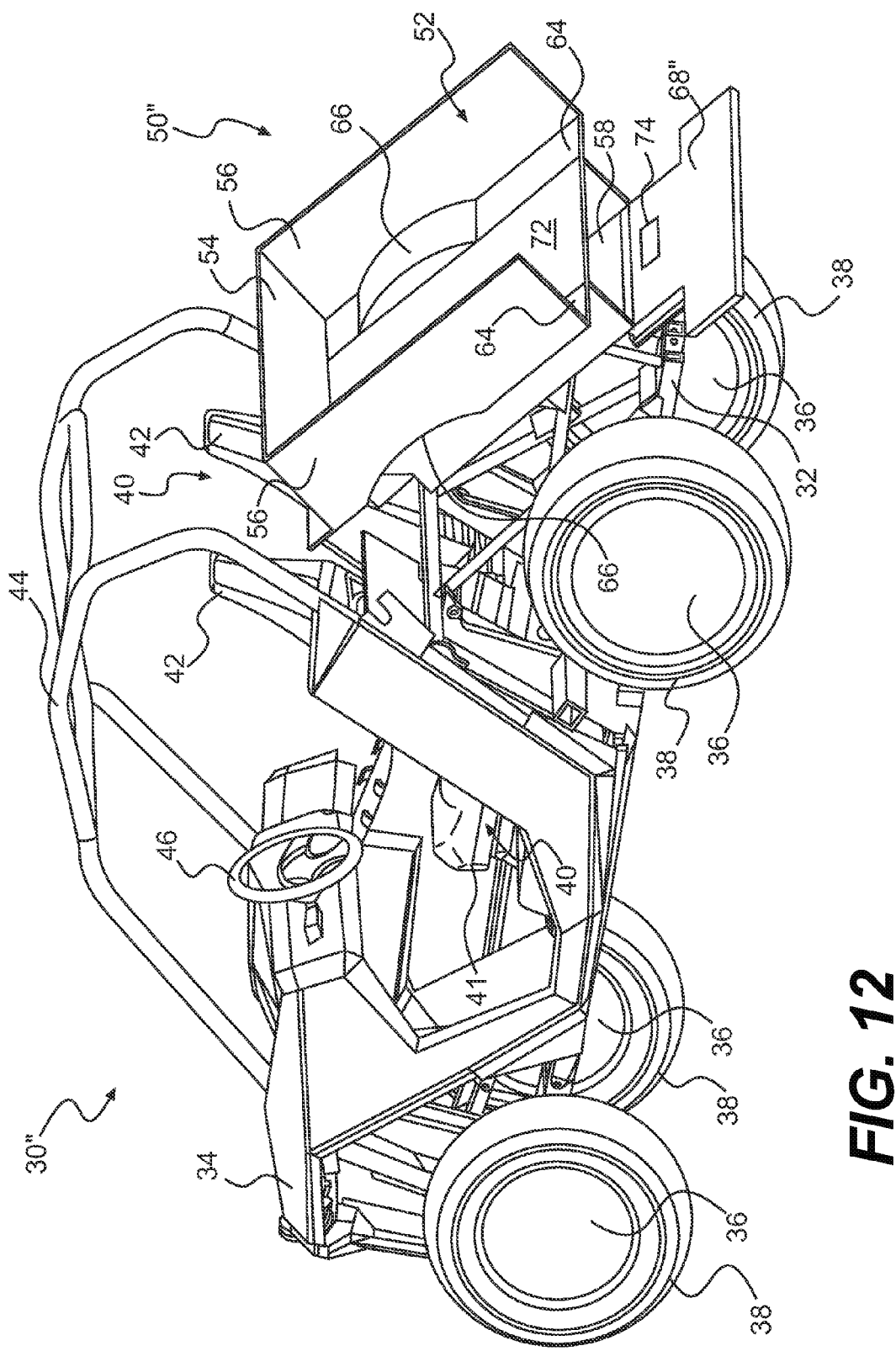
FIG. 12 is a perspective view, taken from a rear, left side of another alternative embodiment of the RUV of FIG. 2.

As can be seen in FIGS. 7, 8, and 10, the lower and upper tailgates 68, 70 can be opened independently from each other (FIGS. 7 and 8) or at the same time (FIG. 10). In an alternative embodiment shown in FIG. 11, a RUV 30' has a cargo box 50' which has an upper tailgate 70' pivotally connected to an upper end of a lower tailgate 68' about a generally horizontal axis. In this embodiment, the upper tailgate 70' can be opened independently of the lower tailgate 68', however the lower tailgate 68' can only be opened together with the upper tailgate 70'. In another alternative embodiment shown in FIG. 12, a RUV 30" has a cargo box 50" which has a single tailgate 68" pivotally connected to the lower floor 58. In another alternative embodiment shown in FIG. 13, a cargo box 50''' has lower tailgate 68''' and an upper tailgate 70''' which are pivotally connected to the cargo box body 52 about their upper ends. It is contemplated that the lower tailgate 68''' and the upper tailgate 70''' could be selectively pivotally connected to the cargo box body 52 about either their upper ends or their lower ends to match a user's preference. For simplicity, the components of the RUVs 30' and 30" which are similar to the components of the RUV 30 described above and the components of the cargo boxes 50', 50", and 50''' which are similar to the components of the cargo box 50 described above have been given the same reference numerals and will not be described in detail herein.

Returning to FIGS. 3-8, it can be seen that an upper floor 72 is selectively supported in the cargo box body 52 above the lower floor 58 adjacent the front wall 54 and the pair of side walls 56. It is contemplated that the upper floor could not extend up to the front wall 54 and the pair of side walls 56. When the upper floor 72 is installed in the cargo box body 52, the sides thereof are supported by the steps 64 of the side walls 56 such that the upper floor 72 is relatively levelled with the steps 64. As best seen in FIG. 8 (and also FIGS. 11 and 12 for the alternative embodiments), the upper floor 72 divides the opened rear side of the cargo box body 52 between a lower opened portion and an upper opened portion. The lower opened portion extends from the lower floor 58 to the upper floor 72 and is selectively closed by the lower tailgate 68, thereby defining a lower cargo space. The upper opened portion extends from the upper floor 72 to the upper end of the side walls 56 and is selectively closed by the upper tailgate 70, thereby defining an upper cargo space. It is contemplated that the upper tailgate 70 could not extend all the way up to the upper end of the side walls 56 when it is closed. In the cargo box 50' of FIG. 11, the lower and upper tailgates 68' and 70' selectively close the lower and upper opened portions respectively as in the cargo box 50. As with upper tailgate 70, it is contemplated that the upper tailgate 70' could not extend all the way up to the upper end of the side walls 56 when it is closed. In the cargo box 50" of FIG. 12, the single tailgate 68" selectively closes both the lower and upper opened portions at the same time. The single tailgate 68" is provided with a door 74 in the lower portion thereof which can be opened to access the lower cargo space without having to open the single tailgate 68". It is contemplated that the door 74 could pivot or slide relative to the single tailgate 68". As with upper tailgate 70, it is contemplated that the single tailgate 68" could not extend all the way up to the upper end of the side walls 56 when it is closed. In the cargo box 50''' of FIG. 13, the lower and upper tailgates 68''' and 70''' selectively close the lower and upper opened portions respectively as in the cargo box 50.

Figure 5:
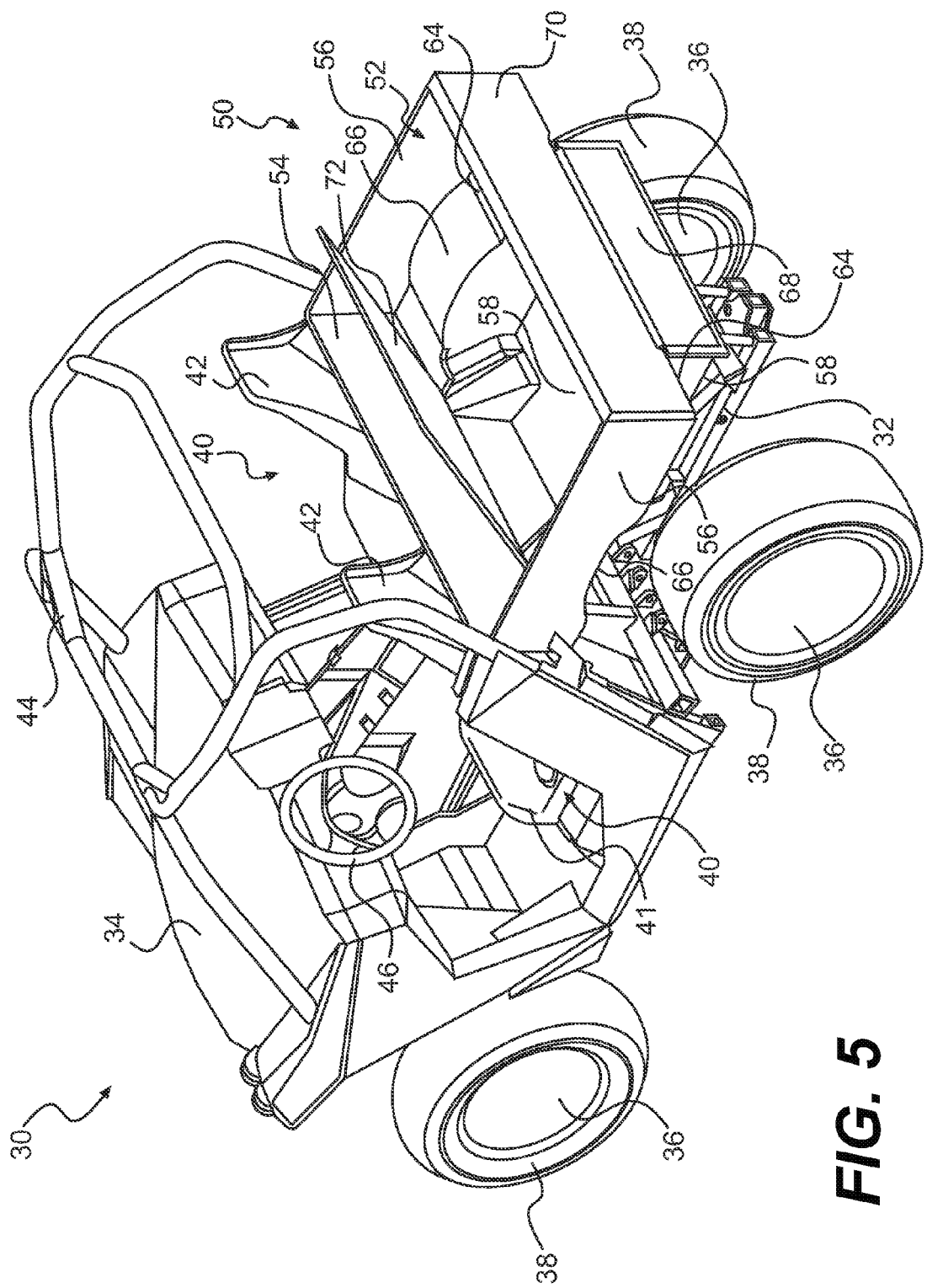
FIG. 5 is a perspective view, taken from a rear, left side of the RUV of FIG. 2 with an upper floor of a cargo box in a pivoted position.
Figure 6:
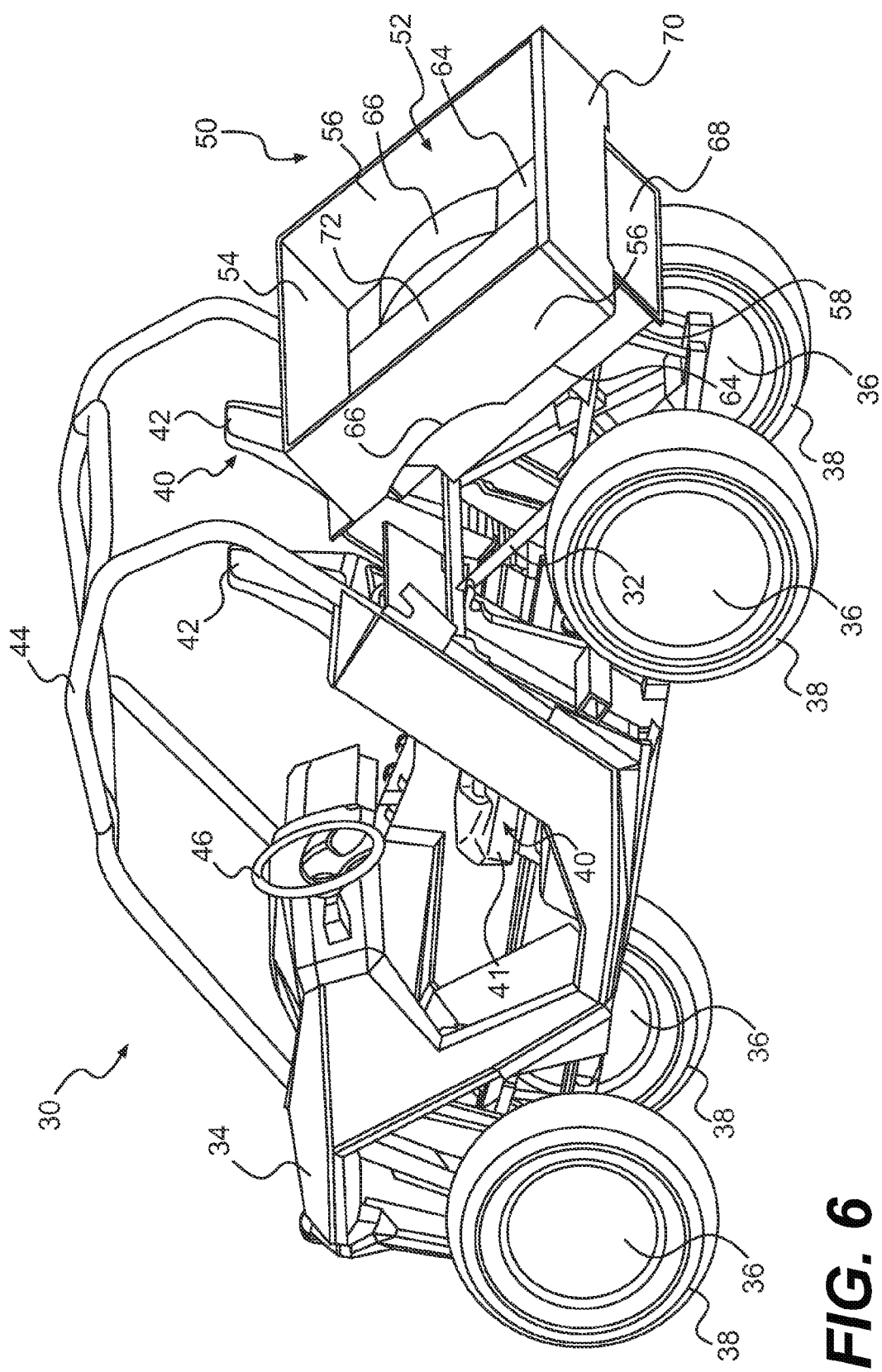
FIG. 6 is a perspective view, taken from a rear, left side of the RUV of FIG. 2 with the cargo box in a pivoted position.
Figure 13:
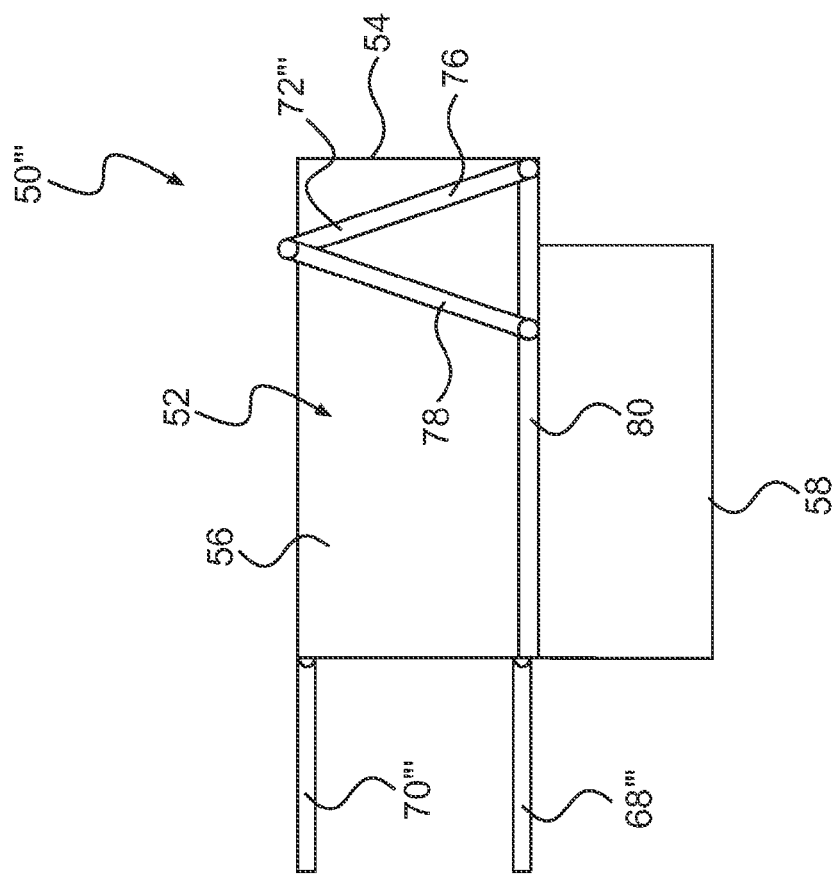
FIG. 13 is a schematic longitudinal cross-section of an alternative embodiment of a cargo box with the upper and lower tailgates in their opened positions.

By having the upper floor 72 disposed inside the cargo box body 52 above the lower floor 58 as shown, cargo can be stored inside the lower and upper cargo spaces separately. For example, sand could be loaded on the upper floor 72 inside the upper cargo space while the shovel used to load the sand could be placed on the lower floor 58 in the lower cargo space. As seen in FIG. 5, the upper floor 72 can be pivoted upwardly relative to the cargo box body 52. This allows the lower cargo space to be easily accessed when there is no (or very little) cargo in the upper cargo space without having to open the lower tailgate 68. As seen in FIG. 9, the upper floor 72 can also be removed from the cargo box body 52, thereby communicating the lower and upper cargo spaces together, thus allowing the full volume of the cargo box body 52 to be used to load cargo. In the alternative embodiment shown in FIG. 13, the upper floor 72''' is made of two sections 76 and 78 pivotally connected to each other. The forward end of the section 76 is pivotally connected to the front of the cargo box body 52. The rearward end of the section 78 is slidably connected inside tracks 80 disposed on either side thereof. The sections 76, 78 can be disposed horizontally to separate the lower cargo space from the upper cargo space. From their horizontal position, the rearward end of the section 78 can be pushed toward the front wall 54 causing the section 78 to slide and pivot upwardly and the section 76 to pivot upwardly as shown in FIG. 13, thereby communicating the lower and upper cargo spaces together.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An off-road vehicle comprising:
   a frame;
   at least four wheels suspended from the frame, each of the at least four wheels including a tire;
   a seat mounted on the frame;
   a steering assembly disposed forwardly of the seat and being operatively connected to at least two of the at least four wheels;
   an engine mounted to the frame and being operatively connected to at least two of the at least four wheels; and
   a cargo box pivotally mounted to the frame rearwardly of the seat, the cargo box including:
      a cargo box body having a front wall, a pair of side walls extending from the front wall, a lower floor connected to a lower end of the front wall and the pair of side walls, and an opened rear side;
      an upper floor supported inside the cargo box body above the lower floor;
      an upper tailgate for selectively closing an upper opened portion of the opened rear side;

a lower cargo space defined at least in part between the front wall, the pair of side walls, the lower floor, and the upper floor; and an upper cargo space defined between the front wall, the pair of side walls, the upper floor, and the upper tailgate when the upper tailgate closes the upper opened portion of the opened rear side.

2. The off-road vehicle of claim 1, wherein the upper floor is removable from the cargo box body, such that when the upper floor is removed the lower cargo space communicates with the upper cargo space.

3. The off-road vehicle of claim 1, wherein each side wall defines a step extending towards the other side wall.

4. The off-road vehicle of claim 3, wherein the upper floor is supported above the lower floor by the steps.

5. The off-road vehicle of claim 1, wherein the upper floor is supported adjacent the front wall and the pair of side walls.

6. The off-road vehicle of claim 1, wherein the upper floor is pivotable relative to the cargo box body.

7. The off-road vehicle of claim 3, wherein the upper tailgate is connected to the steps.

8. The off-road vehicle of claim 7, wherein the upper tailgate is pivotally connected to the steps.

9. The off-road vehicle of claim 1, wherein the seat includes a seat base and a backrest; and wherein the steering assembly includes a steering wheel.

10. The off-road vehicle of claim 9, wherein the seat is a driver seat; and further comprising a passenger seat connected to the frame at a position laterally beside the driver seat, the passenger seat having a seat base and a backrest.

11. The off-road vehicle of claim 1, wherein the seat is a straddle seat; and wherein the steering assembly includes a handlebar.

* * * * *